No. 628,826. Patented July 11, 1899.
J. A. MASON.
HYDROCARBON BURNER.
(Application filed Mar. 10, 1899.)
(No Model.) 2 Sheets—Sheet 1.
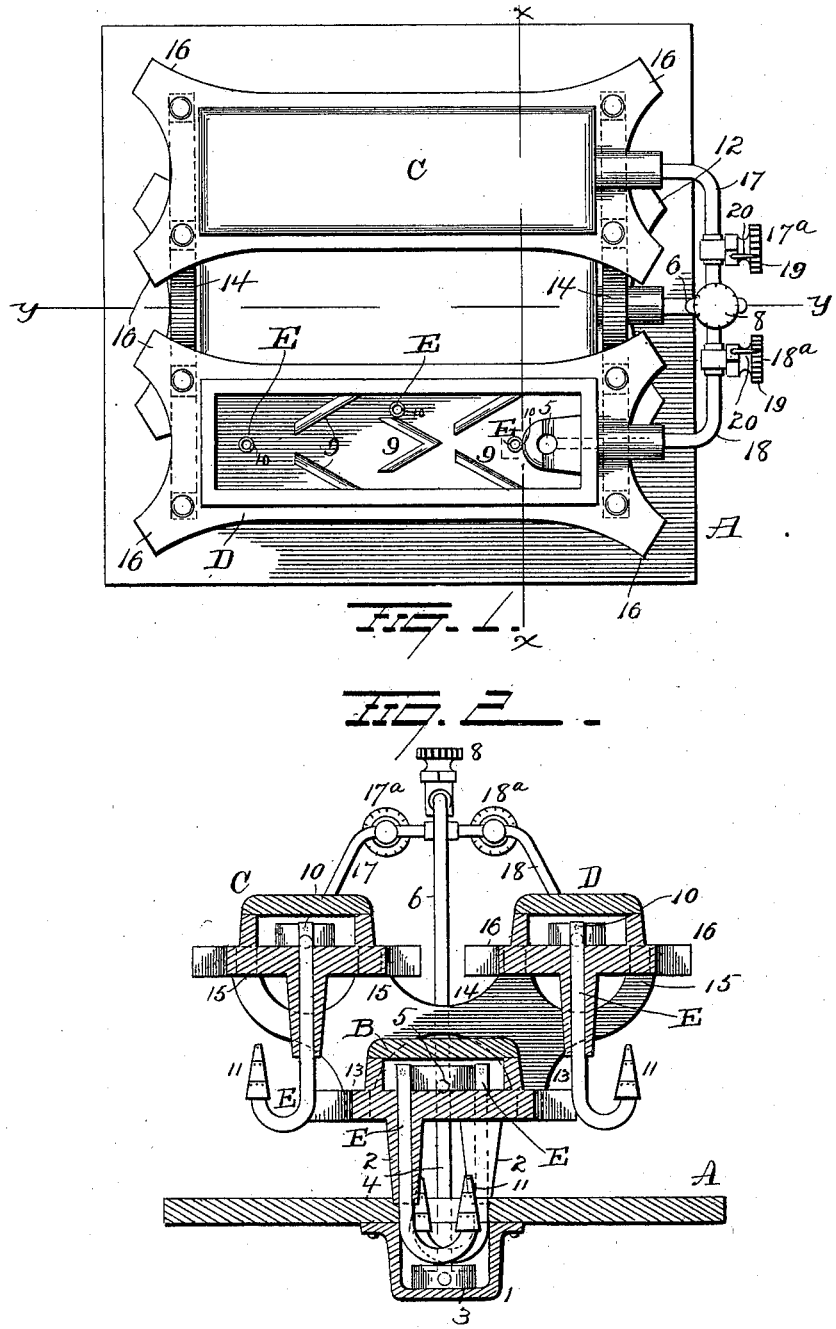
WITNESSES
INVENTOR
J. A. Mason
By H. A. Seymour
Attorney No. 628,826. Patented July 11, 1899.
J. A. MASON.
HYDROCARBON BURNER.
(Application filed Mar. 10, 1899.)
(No Model.) 2 Sheets—Sheet 2.
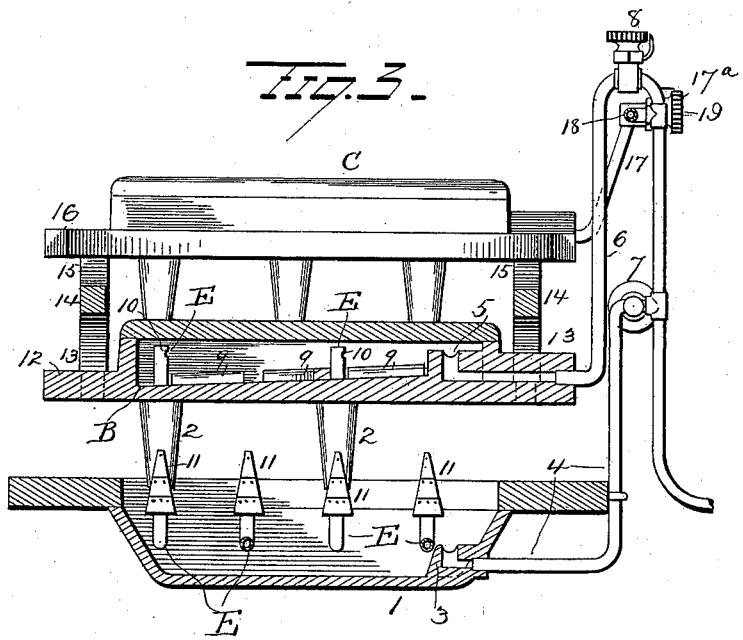
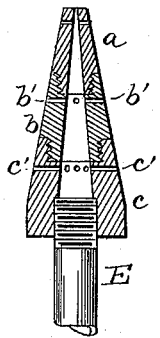
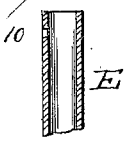
WITNESSES
E. J. Nottingham
G. F. Downing
INVENTOR
J. A. Mason
By H. A. Seymour
Attorney

UNITED STATES PATENT OFFICE.

JAMES A. MASON, OF ALTOONA, PENNSYLVANIA, ASSIGNOR, BY DIRECT AND MESNE ASSIGNMENTS, TO JOSEPH L. GREENWALD, TRUSTEE, OF PHILADELPHIA, PENNSYLVANIA.

HYDROCARBON-BURNER.

SPECIFICATION forming part of Letters Patent No. 628,826, dated July 11, 1899.

Application filed March 10, 1899. Serial No. 708,575. (No model.)

*To all whom it may concern:*

Be it known that I, JAMES A. MASON, a resident of Altoona, in the county of Blair and State of Pennsylvania, have invented certain new and useful Improvements in Hydrocarbon-Burners; and I do hereby declare the following to be a full, clear, and exact description of the invention, such as will enable others skilled in the art to which it appertains to make and use the same.

My invention relates to an improvement in hydrocarbon-burners, one object of the invention being to so construct the apparatus as to obviate possibility of oil escaping through the jet-tubes during the normal operation of the burner and to thus insure a constant supply of vapor to the jets to avoid liability of smoking and "humming," so common with hydrocarbon-burners.

A further object is to produce a hydrocarbon-burner capable of general application for domestic, furnace, or boiler heating which shall be simple in construction and comparatively cheap to manufacture, which shall be safe and easy to operate and manipulate, and which shall be effectual in all respects in the perfect performance of the functions required for all purposes of a heater.

With these objects in view the invention consists in certain novel features of construction and combinations and arrangements of parts, as hereinafter set forth, and pointed out in the claims.

In the accompanying drawings, Figure 1 is a plan view of a hydrocarbon-burner embodying my invention. Fig. 2 is a sectional view on line $x\,x$ of Fig. 1. Fig. 3 is a sectional view on the line $y\,y$ of Fig. 1. Fig. 4 is a detail view of one of the jets. Fig. 5 is a detail of part of a jet-tube.

A represents a base, having a depression forming a pan 1 therein. Over this pan a retort B is located and may be supported on the base-plate in an inclined position by means of legs 2. The pan 1 is provided in its bottom with a perforated enlargement 3, projecting above the face of the bottom of the pan and constituting a small well, with the bottom of which the oil-supply pipe 4 communicates.

The inclined retort B is provided interiorly at its higher end with a well 5, the wall of which projects some distance above the bottom of the retort, and with this well a branch 6 of the oil-supply pipe communicates. Both pipes 4 and 6 are provided with needle-valves 7 8. The retort is provided interiorly on its bottom with a series of ribs 9, which serve to uniformly distribute the oil entering the retort through the well 5. A series of depending jet-tubes E project through the bottom of the retort and terminate at their upper ends near the under face of the top of the retort. The upper end of each jet-tube is open and each tube is provided at a point below said open upper end with a perforation 10 for a purpose hereinafter explained. The lower ends of the jet-tubes are curved upwardly and provided with jets 11, disposed under and adapted to project flames against the bottom of the retort.

In order to regulate the heating capacity of the jets, and consequently the degree to which it may be desired to heat the retort, each jet 11 is made in three (more or less) sections $a\,b\,c$, screwed or otherwise removably secured together. The section $a$ may have the jet-orifice at its end and may alone constitute the jet when it is not desired to heat the retort to a considerable degree. The sections $b$ and $c$ are provided with peripheral series of jet-orifices $b'\,c'$.

The retort B may be provided at its ends with arms or projections 12, which serve to support depending legs 13 of two bars or frames 14. The bars or frames 14 are each provided with posts or upright arms 15, which serve to receive and support arms of projections 16 on the ends of two retorts C D, disposed above and at respective sides of the retort B. The construction of the retorts C and D and the construction and arrangement of the jet devices coöperating therewith are precisely the same as the retort B and the jet devices attached to it, and hence it is not necessary to repeat the detailed description of these parts in referring to the retorts C and D.

Branches 17 18 of the oil-supply pipe communicate with the wells of the retorts C and D, and each of said branch pipes is provided with a needle-valve $17^a\,18^a$, whereby to control the supply of oil to said retorts. The knob of each needle-valve is provided with graduations 19, which coöperate with pointers 20 to form indicators to denote the quantity of oil being fed to the retorts.

Heretofore much difficulty and annoyance have been occasioned in the operation of hydrocarbon-burners of the class to which my invention relates on account of their liability to smoke, to become clogged, and to hum. The cause of this has been due to the fact that the oil would pass into the jet-tubes and burn at the jets. It is essential to the proper and successful operation of burners of the class to which this invention relates that vapor and vapor alone be burned at the jets, and many unsuccessful attempts have been made to accomplish this. It is believed from experiment that when the retort is supplied with oil and heat is applied under it the vapor generated will invariably go immediately to the top of the chamber and that the air which entered the retort with the oil will become disposed in the chamber between the vapor and the oil. In view of this presence of air between the oil and the vapor considerable suction will be created within the retort, and the oil will be driven into the jet-tubes even when the inlet ends of the latter are disposed near the top of the chamber. It has been found by actual experiment that solid particles of metal in the retort have been raised and deposited upon the inlet end of the jet-tubes. It is believed, therefore, that in order to avoid the consequences above enumerated of oil entering the jet-tubes the air in the retort between the oil and the vapor must be removed in a manner and at a time to insure the free entrance of vapor alone into the tubes, and that this I accomplish by providing the jet-tube with the hole 10, which communicates with the interior of the retort at the point therein where the stratum of air will form and preferably in the side thereof toward the oil-inlet. Thus it appears that during the operation of the burner there may always be oil in the bottom of the retort, that above the oil there will always be a stratum of air and above the latter there will be a stratum of vapor, and that vapor will enter the upper end of the jet-tube and the air under the stratum of vapor will simultaneously enter the jet-tube through the hole 10 below the upper end thereof, and the air and vapor will pass to the jets. In this way I am enabled to prevent oil from entering the jet-tubes and still permit a quantity of oil to be maintained in the bottom of the retort. This maintenance of a quantity of oil in the retort is itself a decided advantage, as it prevents the undue heating of the oil-inlet pipes. This has been demonstrated by experiment.

My improved burner may be used for domestic heating, or it may be made of sufficient size and capacity to supply heat for locomotive or other boilers.

Slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. In a hydrocarbon-burner, the combination with a retort and a burner, of a feed-pipe for the burner projecting into the retort and having its end open near the top of the retort and having a lateral opening communicating with the interior of the retort.

2. In a hydrocarbon-burner, the combination with a retort having an inlet for hydrocarbon oil, of a burner below the retort and a feed-pipe communicating at one end with the burner and terminating at its upper end within the retort near the top thereof, the upper end of the pipe being open and having a hole therein on the side thereof toward the hydrocarbon-inlet and communicating with the interior of the retort.

3. In a hydrocarbon-burner, the combination with a retort having an oil-well therein, the wall of which projects above the bottom of the retort, of a burner, a feed-pipe communicating at one end with said burner, the other end of said pipe being open and communicating with the interior of the retort near the top thereof, said pipe having a lateral opening below said open end and at the side of the pipe toward the oil-well.

4. In a hydrocarbon-burner, the combination of a retort, an oil-supply pipe entering the same, one or more burners arranged to heat the retort and a burner feed pipe or pipes leading from the burner or burners into the retort, said feed pipe or pipes each having a portion extending into the retort and freely opening at the upper end into and near the top of the retort, said portion also having a lateral passage through it also opening into the retort above the oil-level in said retort but at a lower level than the end opening.

5. In a hydrocarbon-burner, the combination of a retort, a well in said retort having its wall projecting above the bottom thereof, an oil-supply pipe communicating with said well, a jet-tube communicating at its end with the upper part of the retort and communicating below its end with the intermediate part of the retort.

6. In a hydrocarbon-burner, the combination with a base, a retort thereon, jet-tubes communicating with said retort and discharging under the same, bars supported by said retort, retorts supported by said bars at respective sides of said first-mentioned retort, and jet-tubes communicating with the upper retorts and discharging under the same.

In testimony whereof I have signed this specification in the presence of two subscribing witnesses.

JAMES A. MASON.

Witnesses:
R. S. FERGUSON,
W. CLARENCE DUVALL.